(12) United States Patent
Lim et al.

(10) Patent No.: US 7,106,696 B1
(45) Date of Patent: Sep. 12, 2006

(54) SYSTEMS AND METHODS FOR LIMITING THE RATES OF DATA TO/FROM A BUFFER

(75) Inventors: Raymond Marcelino Manese Lim, Los Altos Hills, CA (US); Song Zhang, San Jose, CA (US); Anurag P. Gupta, Saratoga, CA (US); Brian Gaudet, San Jose, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 907 days.

(21) Appl. No.: 09/942,630

(22) Filed: Aug. 31, 2001

(51) Int. Cl.
*G06F 11/00* (2006.01)
*H04L 12/26* (2006.01)

(52) U.S. Cl. .................. 370/230.1; 370/232; 370/235; 370/253

(58) Field of Classification Search ........ 370/230–237, 370/235
See application file for complete search history.

(56) References Cited

U.S. PATENT DOCUMENTS

| | | | |
|---|---|---|---|
| 4,499,577 A * | 2/1985 | Baranyai et al. ............ 370/267 |
| 5,434,892 A * | 7/1995 | Dike et al. .................. 375/377 |
| 5,455,826 A * | 10/1995 | Ozveren et al. ............ 370/232 |
| 5,654,963 A * | 8/1997 | Abe et al. .................. 370/234 |
| 5,982,751 A * | 11/1999 | Kim et al. .................. 370/235 |
| 6,118,761 A * | 9/2000 | Kalkunte et al. ........... 370/229 |
| 6,144,636 A * | 11/2000 | Aimoto et al. .............. 370/229 |
| 6,215,768 B1 * | 4/2001 | Kim ........................... 370/230 |
| 6,504,818 B1 * | 1/2003 | Levine ....................... 370/229 |
| 6,724,721 B1 * | 4/2004 | Cheriton .................... 370/229 |
| 2002/0159385 A1 * | 10/2002 | Susnow et al. ............. 370/229 |

* cited by examiner

*Primary Examiner*—Afsar Qureshi
(74) *Attorney, Agent, or Firm*—Harrity Snyder, LLP

(57) ABSTRACT

A system controls the transfer of data. The system receives a request to transfer data and determines whether a counter value equals or exceeds a threshold. The counter value represents an amount of time since a previous data transfer. When the counter value equals or exceeds the threshold, the system transmits the data. In another implementation, the system tracks the amount of data read from a buffer. The system reduces the speed at which data is read when the amount of data read from the buffer exceeds a threshold.

17 Claims, 7 Drawing Sheets

SYSTEMS AND METHODS FOR LIMITING THE RATES OF DATA TO/FROM A BUFFER

BACKGROUND OF THE INVENTION

1. Field of the Invention

The present invention relates generally to flow control, and more particularly, to controlling the rate of data flow.

2. Description of Related Art

A router receives data on a physical media, such as optical fiber, analyzes the data to determine its destination, and outputs the data on a physical media in accordance with the destination. A router typically includes buffers that temporarily store the data during the above-described processing. In those situations when data is transferred to these buffers at a rate that exceeds the rate at which the data is read from the buffers, the buffers may experience an overflow condition. When an overflow condition occurs, the buffers may transmit a flow control signal to the device from which data is transferred in order to suspend the transfer of data until the overflow condition has been eliminated.

If the delay associated with the flow control signal is large, the device that is transmitting the data may continue transmitting to transfer data to the overflowed buffer until the flow control signal is received. The buffers may discard the data received after the flow control signal has been transmitted, resulting in possibly a large amount of data being discarded.

Another alternative is to initiate flow control well before the buffer is full, so that all in-flight data within the flow control latency can be absorbed. However, this approach increases the size of the buffer, which in some cases can be too large to fit on a physical chip.

It is, therefore, desirable to improve the flow control latency in a network device. However, latency can be reduced only up to a point, especially when the network device is partitioned over multiple physical chips. Hence, a better flow control approach is needed.

SUMMARY OF THE INVENTION

One aspect consistent with principles of the invention is directed to a method for transferring data. The method includes receiving a request to transfer data and determining whether a counter value equals or exceeds a threshold. The counter value represents an amount of time since a previous data transfer. The method transfers the data when the counter value equals or exceeds the threshold.

A second aspect consistent with principles of the invention is directed to a network device that includes a transfer request unit, a rate limiter, and an arbiter. The transfer request unit generates a request to transfer data. The rate limiter controls a rate at which data is transferred. The arbiter receives the request and transfers the data at a rate determined by the rate limiter.

A third aspect consistent with principles of the invention is directed to a method for preventing a buffer overflow condition. The method includes determining a delay associated with transmitting a flow control signal from the buffer to a device that transmits data to the buffer, setting a threshold value to equal or exceed the determined delay, and limiting transmission of data to the buffer based on the threshold value.

A fourth aspect consistent with principles of the invention is directed to a network device that includes an output buffer that stores data and a throttle controller. The throttle controller tracks an amount of data read from the buffer and reduces a speed at which data is read from the buffer when the amount of data exceeds a threshold.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

As described herein, a buffer management system is provided that improves traffic flow in a network device. In one implementation consistent with principles of the invention, a rate limiter is provided that limits the rate at which data is transferred to a buffer so as to avoid an overflow condition. In another implementation, a throttle controller is provided that limits the rate at which data is read from a buffer to avoid an underflow condition.

System Configuration

Figure 1:
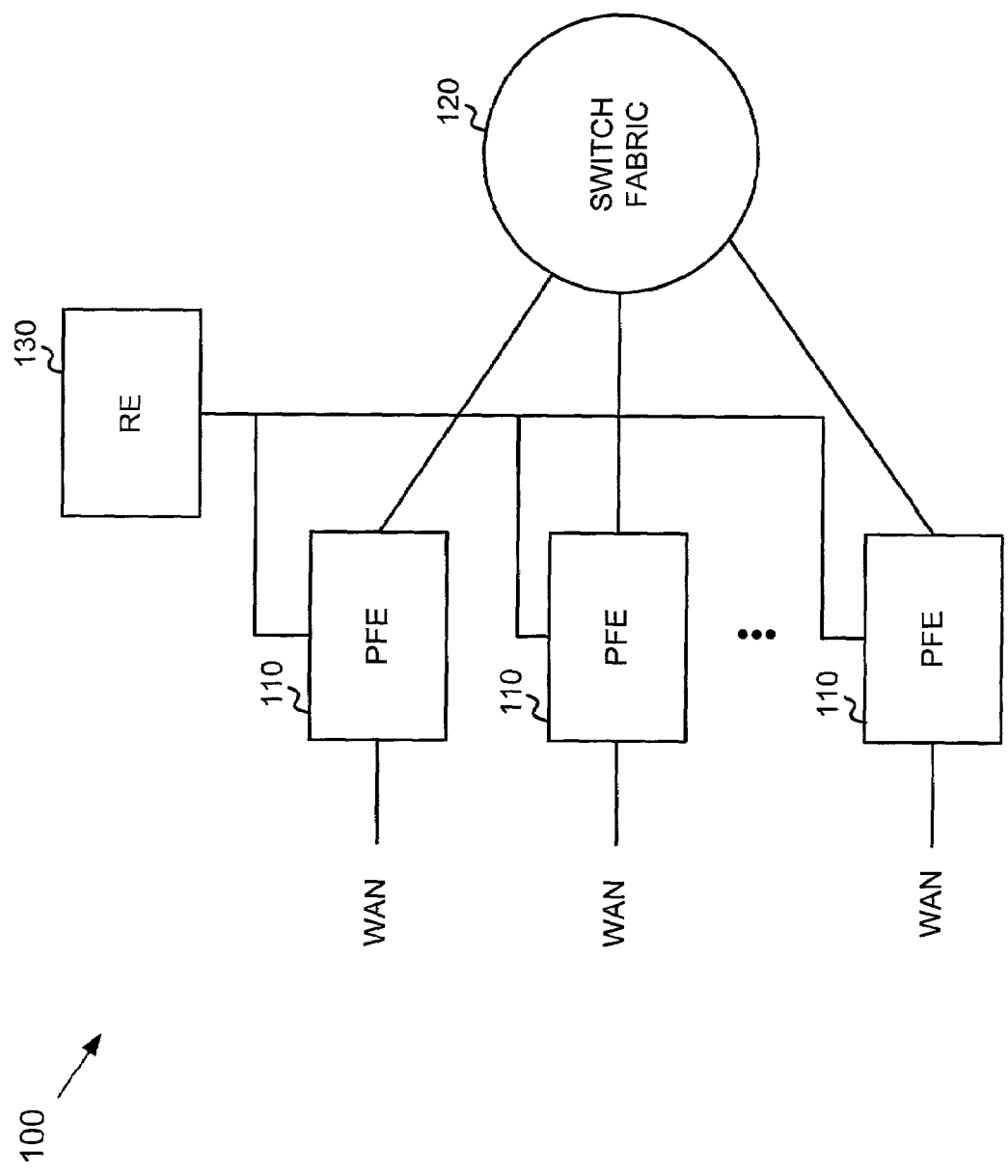
FIG. 1 is a block diagram illustrating an exemplary routing system in which the invention may be implemented.

FIG. 1 is a block diagram illustrating an exemplary routing system 100 in which systems and methods consistent with the principles of the invention may be implemented. System 100 receives a data stream from a physical link, processes the data stream to determine destination information, and transmits the data stream out on a link in accordance with the destination information. System 100 may include packet forwarding engines (PFEs) 110, a switch fabric 120, and a routing engine (RE) 130.

RE 130 performs high level management functions for system 100. For example, RE 130 communicates with other networks and systems connected to system 100 to exchange information regarding network topology. RE 130 creates routing tables based on network topology information, creates forwarding tables based on the routing tables, and forwards the forwarding tables to PFEs 110. PFEs 110 use the forwarding tables to perform route lookup for incoming packets. RE 130 also performs other general control and monitoring functions for system 100.

PFEs 110 are each connected to RE 130 and switch fabric 120. PFEs 110 receive data at ports on physical links connected to a network, such as a wide area network (WAN). Each physical link could be one of many types of transport media, such as optical fiber or Ethernet cable. The data on the physical link is formatted according to one of several protocols, such as the synchronous optical network (SONET) standard or Ethernet.

PFE 110 processes incoming data by stripping off the data link layer. PFE 110 converts header information from the remaining data into a data structure referred to as a notification. For example, in one embodiment, the data remaining after the data link layer is stripped off is packet data. PFE 110 converts the layer 2 (L2) and layer 3 (L3) packet header information included with the packet data into a notification. PFE 110 may store the notification, some control information regarding the packet, and the packet data in a series of cells. In one embodiment, the notification and the control information are stored in the first two cells of the series of cells.

PFE 110 performs a route lookup using the notification and the forwarding table from RE 130 to determine destination information. PFE 110 may also further process the notification to perform protocol-specific functions, policing, and accounting, and might even modify the notification to form a new notification.

If the destination indicates that the packet should be sent out on a physical link connected to PFE 110, then PFE 110 retrieves the cells for the packet and converts the notification or new notification into header information. PFE 110 may then form a packet using the packet data from the cells and the header information and transmit the packet from the port associated with the physical link.

If the destination indicates that the packet should be sent to another PFE via switch fabric 120, then PFE 110 retrieves the cells for the packet, modifies the first two cells with the new notification and new control information, if necessary, and sends the cells to the other PFE via switch fabric 120. Before transmitting the cells over switch fabric 120, PFE 110 appends a sequence number to each cell, which allows the receiving PFE to reconstruct the order of the transmitted cells. Additionally, the receiving PFE uses the notification to form a packet using the packet data from the cells, and sends the packet out on the port associated with the appropriate physical link of the receiving PFE.

In summary, RE 130, PFEs 110, and switch fabric 120 perform routing based on packet-level processing. PFEs 110 store each packet using cells while performing a route lookup using a notification, which is based on packet header information. A packet might be received on one PFE and go back out to the network on the same PFE, or be sent through switch fabric 120 to be sent out to the network on a different PFE.

Figure 2:
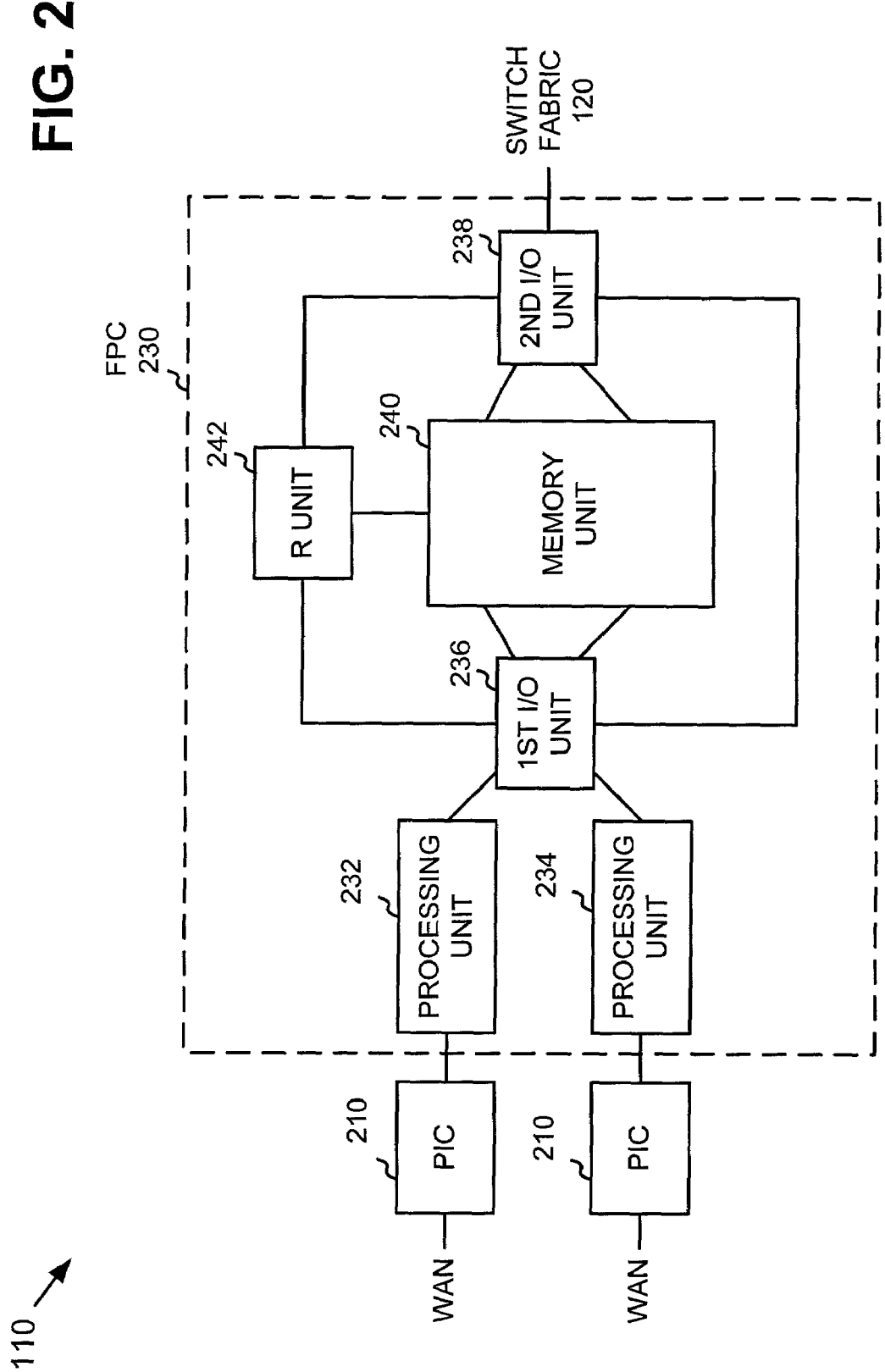
FIG. 2 is an exemplary illustration of the packet forwarding engine (PFE) of FIG. 1 according to one embodiment of the invention.

FIG. 2 is an exemplary illustration of PFE 110 according to one embodiment of the invention. PFE 110 may include physical interface cards (PICs) 210 and 220 connected to a flexible port concentrator (FPC) 230. While two PICs 210 and 220 are shown in FIG. 2, there may be more or fewer PICs in other implementations consistent with principles of the invention.

PICs 210 and 220 connect to WAN physical links and FPC 230 and transport data between the WAN and FPC 230. Each of PICs 210 and 220 transmits data between a WAN physical link and FPC 230. Each PIC 210 and 220 may be designed to handle a particular type of physical link. For example, a particular PIC may be provided to handle only Ethernet communications.

For incoming data, PICs 210 and 220 may strip off the layer 1 (L1) protocol information and forward the remaining data, possibly in the form of raw packets, to FPC 230. For outgoing data, PICs 210 and 220 may receive packets from FPC 230, encapsulate the packets in L1 protocol information, and transmit the data on the physical WAN link.

FPC 230 performs packet transfers between PICs 210 and 220 and switch fabric 130. For each packet it handles, FPC 230 may perform route lookup based on packet header information to determine destination information and send the packet either to PIC 210 and 220 or switch fabric 130, depending on the destination information.

FPC 230 may include processing units 232 and 234, first input/output (I/O) unit 236, second I/O unit 238, memory 240, and R unit 242. Each of processing units 232 and 234 corresponds to one of PICs 210 and 220. Processing units 232 and 234 may process packet data flowing between PICs 210 and 220, respectively, and first I/O unit 236. Each of processing units 232 and 234 may operate in two modes: a first mode for processing packet data received from PIC 210 or 220 connected to it, and a second mode for processing data received from first I/O device 236.

In the first mode, processing unit 232 or 234 may process packets from PIC 210 or 220, respectively, convert the packets into data cells, and transmit the data cells to first I/O unit 236. Data cells are the data structure used by FPC 230 internally for transporting and storing data. In one implementation, data cells are 64 bytes in length.

Packets received by processing unit 232 or 234 may include two portions: a header portion and a packet data portion. For each packet, processing unit 232 or 234 may process the header and insert the results of the processing into the data cells. For example, processing unit 232 or 234 might parse L2 and L3 headers of incoming packets and place the results in the data cells. The data stored in the data cells might also include some of the original header information, as well as processed header information. Processing unit 232 or 234 may also create control information based on the packet. The control information may be based on the packet header, the packet data, or both. Processing unit 232 or 234 may then store the processing results, control information, and the packet data in data cells, which it sends to first I/O unit 236.

In the second mode, processing unit 232 or 234 handles data flow in a direction opposite the first mode. In the second mode, processing unit 232 or 234 receives data cells from first I/O unit 236, extracts certain information and packet data from the data cells, and creates a packet based on the extracted information. Processing unit 232 or 234 creates the packet header from the information extracted from the data cells. In one embodiment, processing unit 232 or 234 creates L2 and L3 header information based on the extracted information. Processing unit 232 or 234 may load the packet data portion with the packet data from the data cells.

First I/O unit 236 and second I/O unit 238 coordinate data transfers into and out of FPC 230. Upon receiving data cells, first I/O unit 236 and second I/O unit 238 may extract certain information stored in the data cells, create a key based on the extracted information, and store the key in a notification. The key may contain information later used by R unit 242 to perform a route lookup for data cells received from processing unit 232 or processing unit 234, or encapsulation lookup, for data cells received from another PFE via switch fabric 120.

First I/O unit 236 and second I/O unit 238 may store the data cells in memory unit 240. First I/O unit 236 and second I/O unit 238 may store, in the notification, address information identifying the locations of the data cells in memory unit 240. The address information may be extracted from the notification later and used to read the data cells from memory unit 240. First I/O unit 236 and second I/O unit 238 may send the notification to R unit 242. While first I/O unit 236 and second I/O unit 238 are shown as separate units, they may be implemented as a single unit in other embodiments consistent with the principles of the invention.

R unit 242 may receive notifications from first I/O unit 236 and second I/O unit 238. R unit 242 may provide route lookup, accounting, and policing functionality based on the notifications. R unit 242 may receive one or more forwarding tables from RE 130 (FIG. 1) and use the keys, forwarding table(s), and encapsulation tables to perform route or encapsulation lookups. R unit 242 may insert the lookup result into a notification, which it may store in memory unit 240.

Memory unit 240 may temporarily store data cells from first I/O unit 236 and second I/O unit 238 and notifications from R unit 242. Memory 240 may dispatch the notifications to first I/O unit 236 and second I/O unit 238. In response, first I/O unit 236 and second I/O unit 238 may use the address information in the notification to read out data cells from memory unit 240 that correspond to a notification. The notification received from memory unit 240 may have been previously modified by R unit 242 with route or encapsulation lookup results. First I/O unit 236 and second I/O unit 238 may update the data cells read out of memory unit 240 with information from the modified notification. The data cells, which now include information from the modified notification, are sent to processing unit 232, processing unit 234, or switch fabric 120, depending on which of first I/O unit 236 or second I/O unit 238 is processing the notification.

Figure 3:
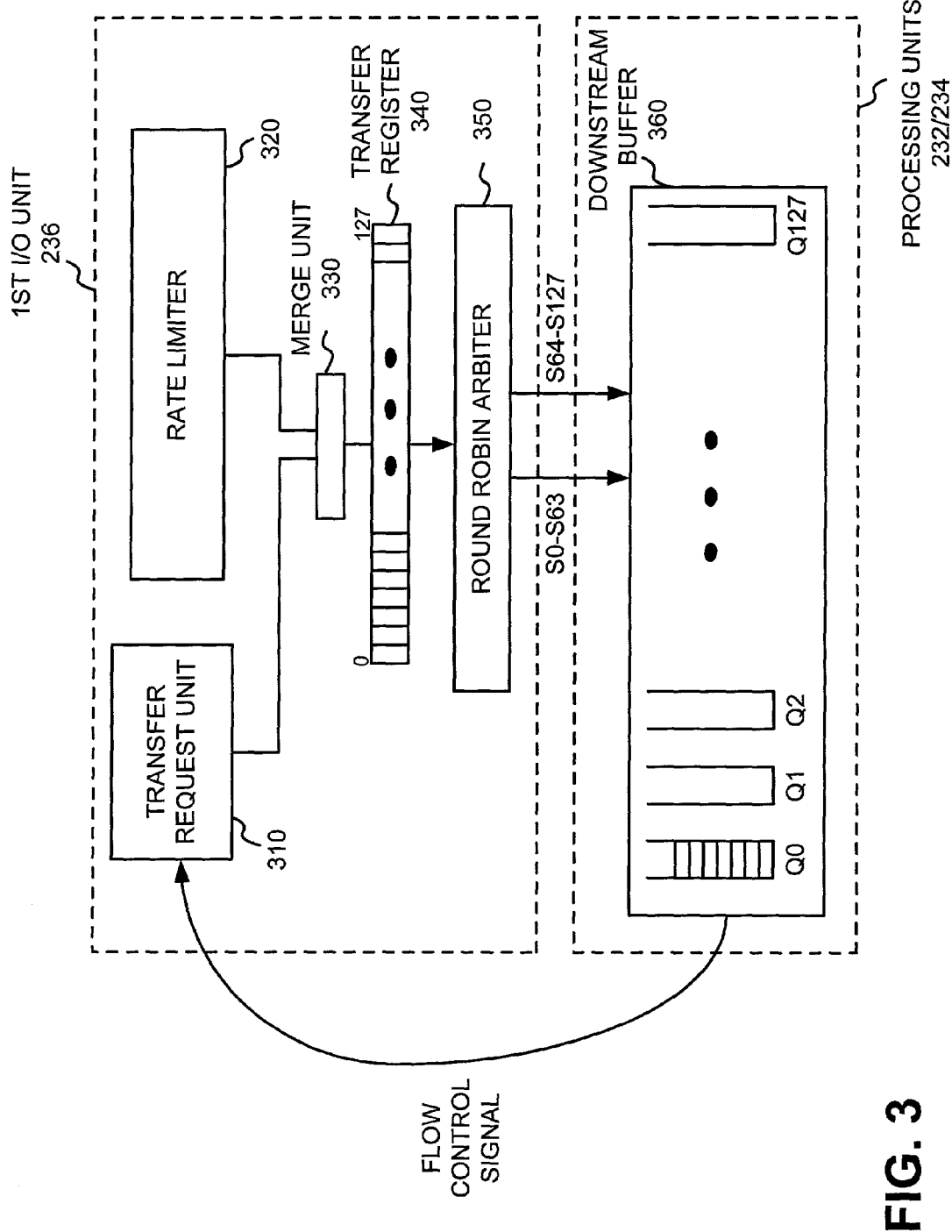
FIG. 3 is an exemplary illustration of the first I/O unit and processing units of FIG. 2 in additional detail.

FIG. 3 is an exemplary illustration of first I/O unit 236 and one of processing units 232 or 234 in additional detail. First I/O unit 236 includes a transfer request unit 310, a rate limiter 320, a merge unit 330, a transfer register 340, and a round robin arbiter 350. Processing units 232/234 include a downstream buffer 360, which includes a flow control signal to transfer request unit 310. It will be appreciated that first I/O unit 236 and processing units 232 and 234 may include additional devices (not shown) that aid in the reception, transfer, and/or processing of data cells.

First I/O unit 236 transfers data cells to processing units 232/234 via a group of data streams. In an exemplary embodiment, first I/O unit 236 may transfer data cells to processing units 232/234 via 128 different streams, labeled S0–S127. It will be appreciated that other configurations are possible.

Transfer request unit 310 requests the transfer of data cells to processing units 232 and 234. When transfer request unit 310 wants to request transfer of one or more data cells via a particular stream, transfer request unit 310 transfers a signal (e.g., a "1" bit) and information identifying the stream, to merge unit 330.

Figure 4:
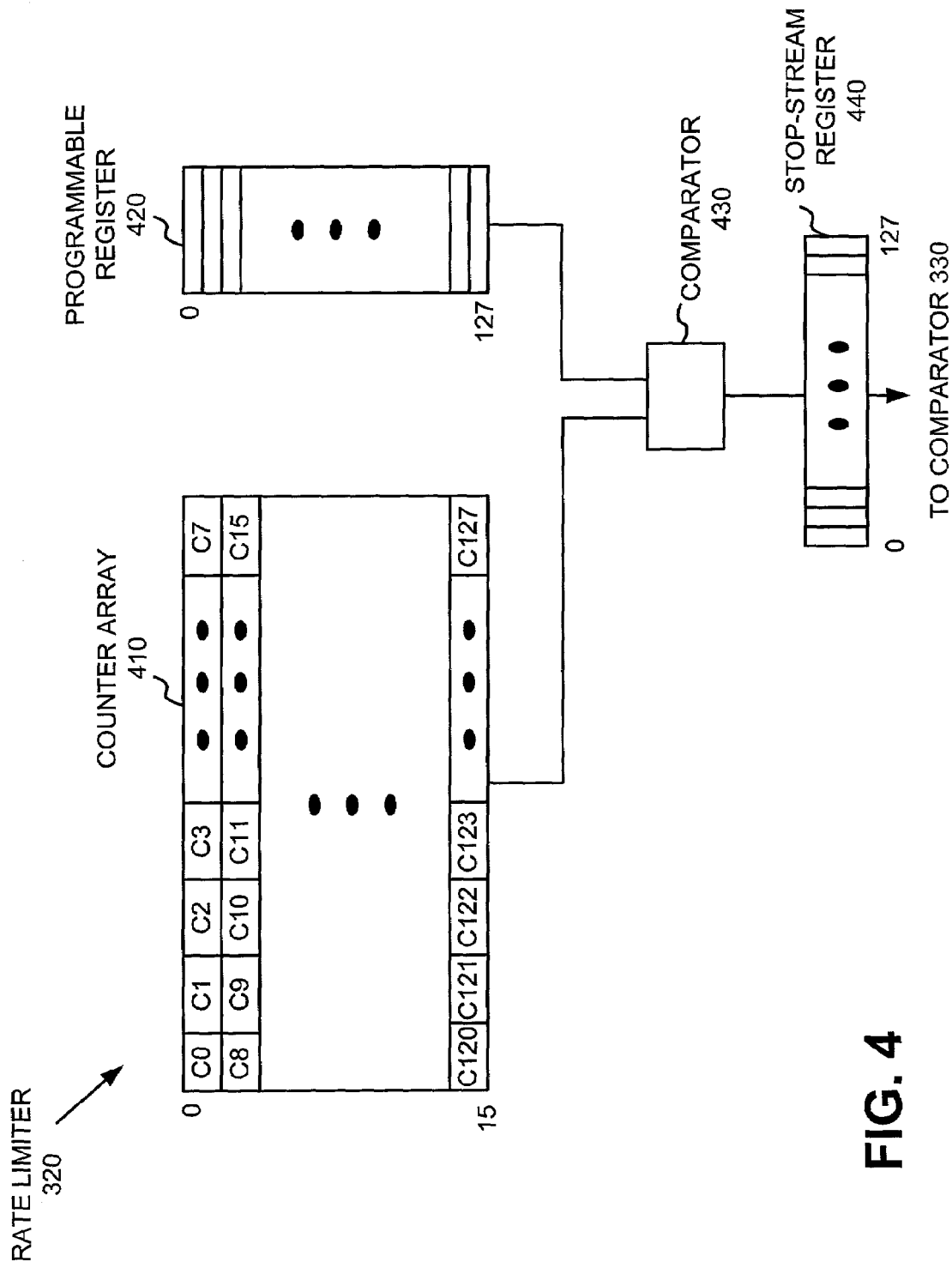
FIG. 4 is an exemplary diagram of the rate limiter of FIG. 3.

Rate limiter 320 limits the rate at which data cells are transferred between first I/O unit 236 and processing units 232/234. FIG. 4 is an exemplary diagram of rate limiter 320 of FIG. 3. As illustrated, rate limiter 320 includes a counter array 410, a programmable register 420, a comparator 430, and a stop-stream register 440.

Counter array 410 may include individual counters, one for each of streams S0–S127 that connects first I/O unit 236 and processing units 232/234. According to an exemplary embodiment, counter array 410 includes 128 4-bit counters, labeled C0–C127, organized as a 32×16 array. Other configurations may alternatively be used. For example, counter array 410 may be replaced by a group of individual counters. Each of counters C0–C127 in counter array 410 tracks the amount of time since a data cell has been transmitted via the counter's associated stream S0–S127, with a ceiling at the maximum value.

In one embodiment, counters C0–C127 are initialized to be "1111" at reset and cleared to zero when a data cell is sent out. Each counter C0–C127 may be increased by 1 every 16 cycles.

Programmable register 420 may include entries corresponding to counters C0–C127 of counter array 410. Each entry of programmable register 420 may store a threshold value to which the value in the corresponding counter C0–C127 is compared to determine whether a data cell may be transmitted via associated stream S0–S127. According to the embodiment described above, programmable register 420 includes 128 entries, labeled 0–127.

Comparator 430 repeatedly sequences through the counters C0–C127 of counter array 410. In each cycle, comparator 430 compares one counter C0–C127 from counter array 410 to its corresponding programmable register 420, and then moves on to the next counter in the next cycle. Alternatively, the comparison can be done on a set of counters in parallel, e.g., 16 counters, before moving on to the next set of counters. When the value in counter C0–C127 equals or exceeds the value in the entry of programmable register 420 associated with that counter, comparator 430 outputs a signal indicative of such. Comparator 430 may, for example, output a "1" when the value in counter C0–C127 equals or exceeds the value in the counter's associated entry of programmable register 420. The output of the comparison operation is used to set a corresponding bit in the stop-stream register 440.

Stop-stream register 440 may include entries corresponding to streams S0–S127. Each entry, labeled 0–127, may store a value that indicates whether a data cell may be transmitted via the corresponding stream S0–S127. As will be described in more detail below, when a data cell is transferred via round robin arbiter 350 for a particular stream, the corresponding counter from counter array 410 is cleared and the corresponding bit in stop-stream register 440 is set (i.e., bit has a value of "1") if the value of corresponding programmable register 420 is not zero.

Rate limiter 320 may also include logic (not shown) for determining the amount of delay associated with the flow control signal (described below). In such a situation, the logic may automatically adjust the entries in programmable register 420 to a value larger than the determined delay.

Returning to FIG. 3, merge unit 330 forwards the signal from transfer request unit 310 if the corresponding bit in stop-stream register 440 within rate limiter 320 is clear (i.e., the bit has a value of "0"). Merge unit 330 may, for example, store a "1" in transfer register 340 when transfer request unit 310 has requested transfer of one or more data cells via a particular stream and the bit for that stream in stop-stream register 440 is "0." Transfer register 340 may include entries corresponding to the number of streams S0–S127 connecting first I/O unit 236 and processing units 232/234. Each entry, labeled 0–127, may store a value that indicates whether a data cell may be transmitted via the corresponding stream S0–S127.

Round robin arbiter 350 selects, in a round robin fashion, a stream by which a data cell may be transmitted. Round robin arbiter 340 may, for example, start at the first entry (i.e., entry 0) of transfer register 340. If the entry contains a "1," indicating that transfer request unit 310 has requested the transfer of one or more data cells via stream 0 and that the value in counter C0 of counter array 410 equals the value in entry 0 of programmable register 420, round robin arbiter 350 may then permit the transfer of a data cell via stream 0. Round robin arbiter 350 may then select the next entry of transfer register 340, and so on. When the last entry (i.e., entry 127) of transfer register 340 is reached, round robin arbiter 350 may then return to entry 0. Round robin arbiter 350 may also use an arbitration algorithm other than round robin.

Downstream buffer 360 may include queues, labeled Q0–Q127, corresponding to each of streams S0–S127. In one embodiment, each queue Q0–Q127 includes eight entries. If the number of entries in any of queues Q0–Q127 reaches a threshold value, processing unit 232/235 transmits a flow control signal to transfer request unit 310 that identifies the overflowing queue Q0–Q127. It will be appreciated that by the time the flow control signal reaches transfer request unit 310, additional data cells may be transferred to the overflowing queue Q0–Q127.

As will be described in more detail below, the threshold values of programmable register 420 may be set to eliminate this situation. For example, assume that the delay associated with the flow control signal is 100 cycles (i.e., it takes 100 cycles for the flow control signal to reach transfer request unit 310 and for transfer request unit 310 to stop sending data cells to the identified queue Q0–Q127). By setting the threshold value to "1111" in each entry of programmable register 420, the streams can only send a data cell every 15*16=240 cycles, which is larger than the round trip latency associated with the flow control signal.

Exemplary Processing

Figure 5:
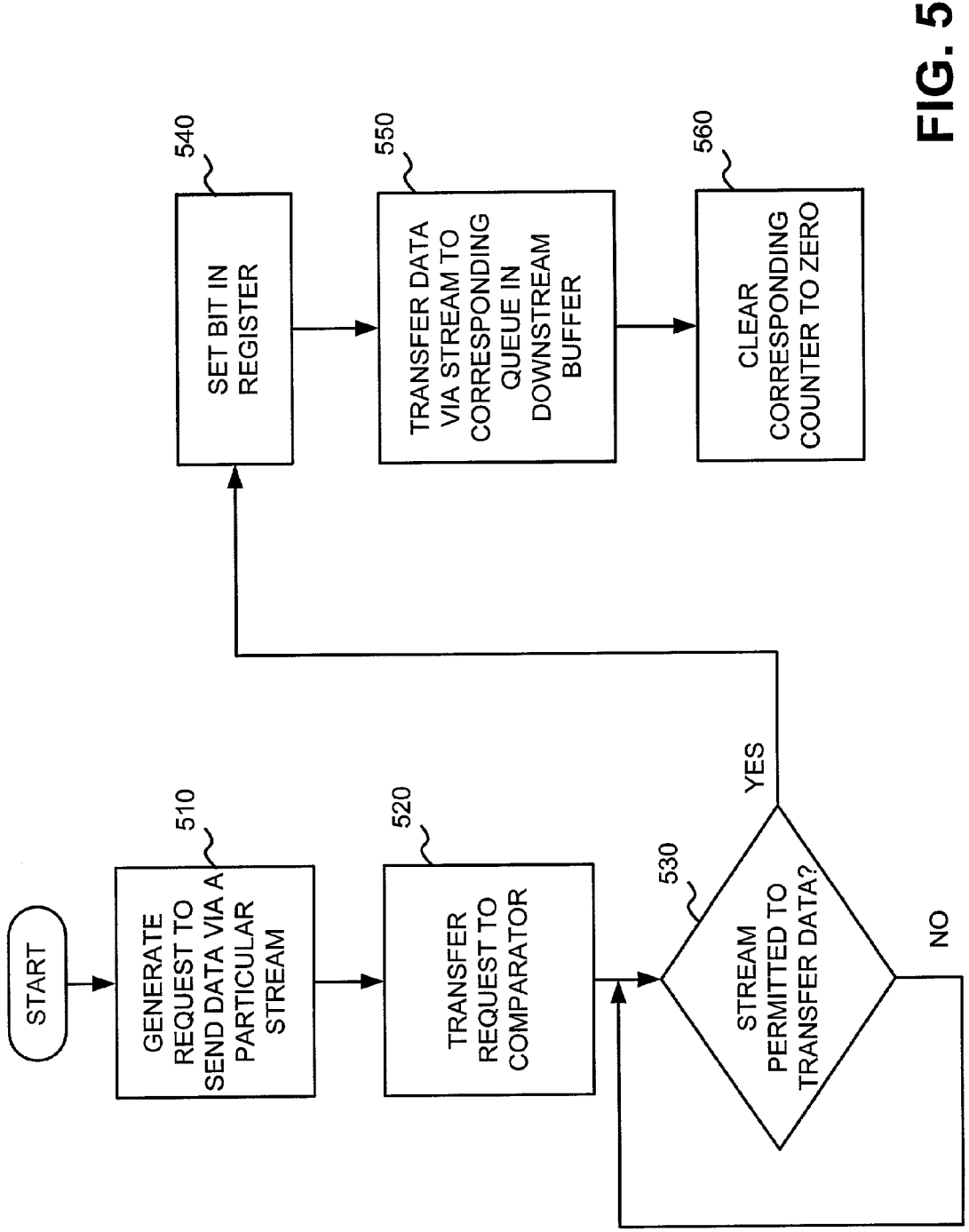
FIG. 5 is a flowchart of an exemplary process for forwarding data cells in an implementation consistent with principles of the invention.

FIG. 5 is a flowchart of an exemplary process for forwarding data cells in an implementation consistent with principles of the invention. Processing may begin with transfer request unit 310 generating a request to transfer a data cell from first I/O unit 236 to one of processing units 232/234 [act 510]. This request may, for example, identify the particular stream S0–S127 by which the data cell is to be transferred. Assume that transfer request unit 310 generates a request identifying stream S0. Transfer request unit 310 may transfer this request to comparator 330 [act 520].

Each cycle, rate limiter 320 compares one counter C0–C127 from counter array 410 to the threshold value in the corresponding entry of programmable register 420. When the value in counter C0–C127 equals or exceeds the threshold value, stream S0–S127, to which that counter C0–C127 corresponds, may transmit a data cell. Rate limiter 320 clears the bit corresponding to that particular stream in stop-stream register 440.

Once the transfer request has been received, merge unit 330 determines whether rate limiter 320 has indicated that that particular stream may transfer data cells [act 530]. Here, rate limiter 320 checks if the corresponding bit in stop-stream register 440 is clear or not. If the bit for stream S0 is set, then the data cell may not be transferred via stream S0 and processing may return to act 530.

As indicated above, the threshold value in each entry in programmable register 420 may be set to such a value so as to allow transfer request unit 310 to receive and act on a flow control signal from downstream buffer 360. If, for example, the delay associated with the flow control signaling is 100 cycles, the threshold value in an entry in programmable register 420 may be set to a value exceeding 100 cycles. This way, when a data cell from first I/O unit 236 causes one of queues Q0–Q127 of downstream buffer 360 to enter an overflow state, rate limiter 320 automatically prevents additional data cells to be transferred to queue Q0–Q127 prior to transfer request unit 310 receiving the flow control signal from downstream buffer 360 and halting the flow of data cells to queue Q0–Q127.

If rate limiter 320 indicates that stream S0 may transfer data cells, comparator 330 sets the bit in the entry of transfer register 340 corresponding to stream S0 [act 540]. Round robin arbiter 350 may sequentially go through the entries in transfer register 340 and allow data cells to be transferred via those streams S0–S127 whose associated entry in register 340 is set [act 550]. Once a data cell has been transferred via a stream S0–S127 to a queue Q0–Q127 in downstream buffer 360, rate limiter 320 clears the corresponding counter C0–C127 to zero [act 560]. Rate limiter 320 will thereafter not permit a data cell to be transferred via the particular stream until the counter value again reaches the threshold value.

Additional Implementation

Figure 6:
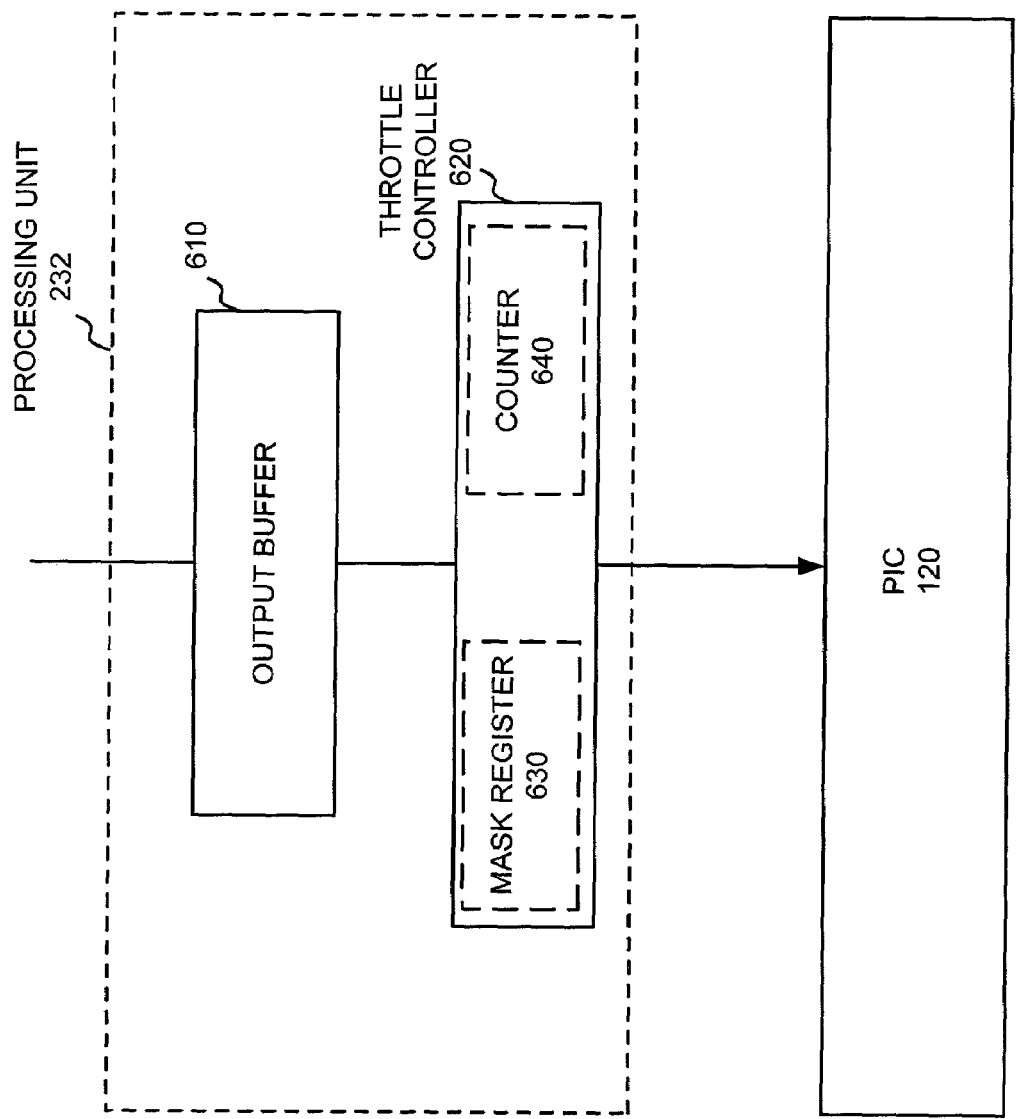
FIG. 6 illustrates an exemplary configuration of a processing unit according to an additional implementation consistent with principles of the invention.

FIG. 6 illustrates an exemplary configuration of processing unit 232 according to an additional implementation consistent with principles of the invention. Processing unit 234 may be similarly configured. As described above, processing unit 232 may operate in two different modes. In the first mode, processing unit 232 may process packets from PIC 210, convert the packets into data cells, and transmit the data cells to first I/O unit 236.

In the second mode, processing unit 232 receives data cells from first I/O unit 236, extracts control information and packet data from the data cells, and creates a packet based on the extracted information. Processing unit 232 may then forward the packets to PIC 210. In this second mode, the interface between processing unit 232 and PIC 210 may be designed to provide a higher data transfer rate, which is needed for short packets that have too much relative overhead on this interface, but this rate is too high for large packets when compared to the rate supported by the rest of system 100. As a result, an output buffer within processing unit 232 may experience an underflow condition, causing an error in system 100. The following configuration slows down the reading of data from processing unit 232 once part of a packet has been read out.

As illustrated, processing unit 232 may include an output buffer 610 and a throttle controller 620. It will be appreciated that processing unit 232 may include additional devices that allow processing unit 232 to perform the functions described above. Output buffer 610 may include one or more queues (not shown) that store packets for transfer to PIC 210.

Throttle controller 620 controls the rate at which packets are read from output buffer 610. Throttle controller 620 includes a mask register 630 and a counter 640. Mask register 630 may store a mask representing the amount of throttling to be applied to output buffer 610 data read operations. This throttle mask may be a predetermined value. In an implementation consistent with principles of the invention, setting the throttle mask to all 1's may cause that throttle counter 620 to mask out every other read opportunity for PIC 120, setting every other bit in the throttle mask may cause throttle controller 620 to mask out one of every four read opportunities, etc. Counter 640 tracks the size of a packet that is read from output buffer 610. As will be described in more detail below, once a predetermined amount of a packet has been read out of output buffer 610, counter 640 signals to throttle controller 620 that throttling should begin.

Exemplary Alternative Processing

Figure 7:
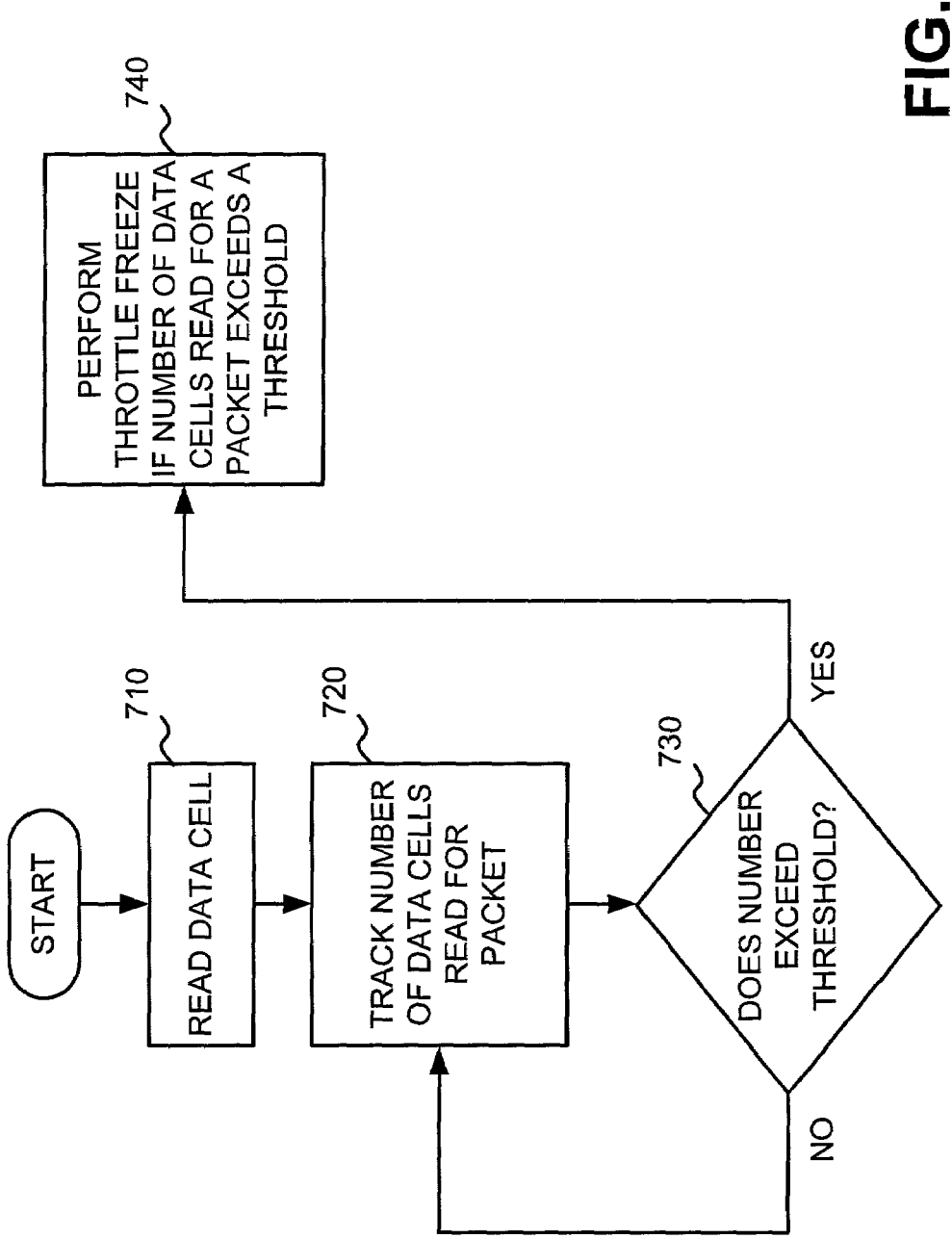
FIG. 7 is a flowchart of exemplary processing for reading data from a processing unit in an implementation consistent with the present invention.

FIG. 7 is a flowchart of exemplary processing for reading data from processing unit 232 in an implementation consistent with the principles of the invention. Processing may begin with PIC 120 reading a data cell from output buffer 610 [act 710]. Counter 640 may track the number of data cells read by PIC 120 for any given packet [act 720]. If the number exceeds a predetermined drain threshold, counter 640 may transmit a signal indicative of such [act 730]. If, for example, output buffer 610 has a drain threshold of 5 data cells, throttle controller 620 need only begin throttling after 10 half cells have been read from output buffer 610.

Throttle controller 620 may then perform a throttle freeze operation based on the mask stored in mask register 630 [act 740]. Throttle controller 620 may consider any even cycle as a read opportunity. When performing a throttle freeze, throttle controller 620 prevents PIC 120 from reading data cells from output buffer 610 during a cycle when there is a read opportunity.

If, in the example above, the throttle mask is all 1's, throttle controller 620 masks out every other read opportunity. If every other bit in the throttle mask is set, throttle controller 620 masks one of every four read opportunities. After throttle controller 620 detects that data cells from a new packet have started being read by PIC 120, throttle controller 620 may cease throttling and reset counter 640.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described in FIGS. 5 and 7, the order of the acts may vary in other implementations consistent with the principles of the invention. Moreover, non-dependent acts may be performed in parallel. No element, act, or instruction used in the description of the present application should be construed as critical or essential to the invention unless explicitly described as such.

The scope of the invention is defined by the claims and their equivalents.

What is claimed is:

1. A network device comprising:
a transfer request unit configured to generate a request to transfer data;
a rate limiter configured to control a rate at which data is transferred; and
an arbiter configured to receive the request and transfer the data at a rate determined by the rate limiter,
wherein the rate limiter includes:
a counter configured to track an amount of time between data transfers,
a first register configured to store a threshold value,
a comparator configured to compare the amount of time to the threshold value and transmit a signal when the amount of time equals or exceeds the threshold value, and
a second register configured to receive the signal and clear an entry indicating that a data transfer is permitted.

2. The network device of claim 1 wherein the threshold value is programmable.

3. The network device of claim 1 wherein the threshold value is set to exceed a delay associated with a flow control signal.

4. The network device of claim 1 wherein the comparator compares the amount of time to the threshold value each cycle.

5. The network device of claim 1 wherein the arbiter transfers the data via one of a plurality of streams.

6. The network device of claim 5 wherein the rate limiter includes:
a plurality of counters, each counter associated with one of the plurality of streams and configured to store a value representing an amount of time between data transfers via the associated stream,
a first register comprising a plurality of entries, each entry corresponding to one of the plurality of streams and configured to store a threshold value,
a comparator configured to:
compare the counter values to the corresponding entries of the register, and
transfer a signal when one of the counter values equals or exceeds the threshold value of the associated entry, and
a second register comprising a plurality of entries, each entry corresponding to one of the plurality of streams and configured to receive the signal and clear a bit when the entry corresponds to the one counter value, indicating that a data transfer is permitted.

7. The network device of claim 6 wherein the comparator compares at least one counter value to the associated entry of the register every cycle.

8. The network device of claim 6 wherein the threshold value of each of the entries is set to exceed a delay associated with a flow control signal.

9. The network device of claim 5 further comprising:
a transfer register comprising a plurality of entries, each of the entries being associated with one of the plurality of streams and configured to store a data transfer permission bit.

10. The network device of claim 9 wherein the arbiter transfers data for a particular stream based on the data transfer permission bit associated with that stream.

11. The network device of claim 5 wherein the plurality of streams includes 128 streams.

12. A system for preventing a buffer overflow condition, comprising:
a register comprising at least one entry configured to store a threshold value, the threshold value equaling or exceeding a delay associated with transferring a flow control signal from the buffer to a device that transmits data to the buffer, the device and the buffer being connected via 128 streams, and the register including 128 entries;
at least one counter configured to store a value representing an amount of time since a previous data transmission to the buffer, the at least one counter includes 128 counters, each of the counters being associated with one of the entries; and
a comparator configured to:
compare the amount of time to the threshold value, and
permit transmission of data to the buffer when the amount of time equals or exceeds the threshold value.

13. The system of claim 12 wherein the counter contains 4 bits.

14. The system of claim 12 wherein the value in the counter is reset when data is transmitted to the buffer.

15. The system of claim 12 further comprising:
a second register coupled to the comparator and comprising at least one entry configured to store a bit indicating whether transmission of data is permitted.

16. A network device comprising:
a first flow control device comprising:
   a transfer request unit configured to generate a request to transfer data,
   a rate limiter configured to control a rate at which data is transferred, the limiter including:
     a counter configured to track an amount of time between data transfers,
     a first register configured to store a threshold value,
     a comparator configured to compare the amount of time to the threshold value and transmit a signal when the amount of time equals or exceeds the threshold value, and
     a second register configured to receive the signal and clear an entry indicating that a data transfer is permitted, and
   an arbiter configured to receive the request and transfer the data at a rate determined by the rate limiter; and
a second flow control device comprising:
   a throttle controller configured to:
     track an amount of data read from a buffer, and
     reduce a speed at which data is read from the buffer when the amount exceeds a threshold.

17. The network device of claim 16 wherein the throttle controller includes:
a counter that tracks the amount of data, and
a mask register configured to store a value representing the speed.

\* \* \* \* \*